(12) United States Patent
Einaudi (10) Patent No.: US 9,841,817 B2
(45) Date of Patent: Dec. 12, 2017

(54) SCULPTED DISPLAYS FOR CLICKABLE USER INTERACTIONS

(71) Applicant: Microsoft Technology Licensing, LLC, Redmond, WA (US)

(72) Inventor: Andrew Einaudi, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/273,682

(22) Filed: May 9, 2014

(65) Prior Publication Data

US 2015/0323992 A1 Nov. 12, 2015

(51) Int. Cl.
| | |
|---|---|
| G06F 3/01 | (2006.01) |
| G06F 3/041 | (2006.01) |
| G06F 3/02 | (2006.01) |
| G06F 3/0488 | (2013.01) |
| G06F 3/0484 | (2013.01) |

(52) U.S. Cl.
CPC ............ *G06F 3/016* (2013.01); *G06F 3/0227* (2013.01); *G06F 3/041* (2013.01); *G06F 3/0412* (2013.01); *G06F 3/0414* (2013.01); *G06F 3/0416* (2013.01); *G06F 3/0484* (2013.01); *G06F 3/04883* (2013.01); *G06F 3/04886* (2013.01); *G06F 2203/04809* (2013.01)

(58) Field of Classification Search
CPC ....... G06F 3/04886; G06F 2203/04809; G06F 3/016
See application file for complete search history.

(56) References Cited

U.S. PATENT DOCUMENTS

| | | | |
|---|---|---|---|
| 6,688,518 B1 * | 2/2004 | Valencia et al. | ............... 235/379 |
| 2005/0024342 A1 | 2/2005 | Young | |

(Continued)

FOREIGN PATENT DOCUMENTS

| | | |
|---|---|---|
| WO | 2011075390 A1 | 6/2011 |
| WO | 2013096227 A1 | 6/2013 |

OTHER PUBLICATIONS

"International Search Report and Written Opinion Issued in PCT Application No. PCT/US2015/029336", Mailed Date: Jul. 9, 2015, 12 Pages.

(Continued)

*Primary Examiner* — Amare Mengistu
*Assistant Examiner* — Shawna Stepp Jones
(74) *Attorney, Agent, or Firm* — Workman Nydegger (57) ABSTRACT

Systems and methods are disclosed of a touch screen display wherein the surface of the touch screen display comprises a sculpted and/or contoured portion. The sculpted/contoured portion gives a user a tactile sense of a portion of the touch screen where commands may be actuated and/or data may be selected. The touch screen display may further be in communication with a physical switch where additional pressure by the user may be used to actuated a command associated with a selected portion of the display. Such a switch may be a piezo structure or other type of physical switch that may also be incorporated into a smart device/controller. Other embodiments may comprise haptic and/or audio feedback upon detection of the user's presence at a desired part of the touch screen display.

25 Claims, 4 Drawing Sheets

(56) References Cited

U.S. PATENT DOCUMENTS

| | | | |
|---|---|---|---|
| 2005/0030292 A1* | 2/2005 | Diederiks | G09B 21/003 |
| | | | 345/173 |
| 2009/0167704 A1 | 7/2009 | Terlizzi et al. | |
| 2009/0213066 A1 | 8/2009 | Hardacker et al. | |
| 2010/0315348 A1 | 12/2010 | Jellicoe et al. | |
| 2011/0292268 A1* | 12/2011 | Mann | B62D 1/046 |
| | | | 348/333.01 |
| 2012/0086651 A1 | 4/2012 | Kwon et al. | |
| 2012/0223914 A1* | 9/2012 | Ciesla et al. | 345/174 |
| 2014/0092025 A1 | 4/2014 | Pala et al. | |

OTHER PUBLICATIONS

"International Search Report and Written Opinion Issued in PCT Application No. PCT/US2015/029336", dated Jul. 9, 2015, 12 pages.

* cited by examiner

SCULPTED DISPLAYS FOR CLICKABLE USER INTERACTIONS

BACKGROUND

Consumer devices now enable a plethora of user interactions that were not available prior to advent of smart devices and controllers. Many of these interactions may be accounted for by use of touch screen displays and their interfaces. Intuitive swiping and other gestures on these displays on tablets, smart phones and controllers have supplanted trackpad and mouse interfaces on laptops and older devices.

Haptic feedback is another useful interface technology that has found great utility in the gaming sector. Such haptic and audio feedback give a whole other sensory dimension to user interactions with smart devices/controllers.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods are disclosed of a touch screen display wherein the surface of the touch screen display comprises a sculpted and/or contoured portion. The sculpted/contoured portion gives a user a tactile sense of a portion of the touch screen where commands may be actuated and/or data may be selected. The touch screen display may further be in communication with a physical switch where additional pressure by the user may be used to actuated a command associated with a selected portion of the display. Such a switch may be a piezo structure or other type of physical switch that may also be incorporated into a smart device/controller.

In one embodiment, a touch screen display comprising: a display panel, said display panel comprising a plurality of touch screen sensors that are capable of detecting the presence of a human user; said display panel comprising a transparent surface such that light from said display panel is visible to a user of said touch screen display; wherein said transparent surface comprises a sculpted portion where said sculpted portion forms a tactile indication to a user of said touch screen display where actuation of a plurality of commands are capable; and wherein further said touch screen display is in communication with a smart device such that a user is capable of actuating one of said plurality of commands.

In another embodiment, a smart device comprising: a touch screen display, said touch screen display comprising a transparent surface, said transparent surface further comprises a sculpted portion providing a tactile clue to a user of the smart device; a switch, said switch in mechanical communication with said touch screen display such that said switch is capable of being actuated by the user applying additional pressure to the touch screen display; a controller, said controller comprising a processor and a computer-readable storage media, said computer-readable storage media capable of storing computer-readable instructions such that when read by said processor, causes the controller to execute the following: detecting the presence of a touch of a user within said sculpted portion; detecting the actuation of said switch when actuated by a user applying a suitable amount of pressure to the touch screen; and executing at least one command associated with the actuation of the actuation of said switch.

In yet another embodiment, a smart device is disclosed comprising: a touch screen display, said touch screen display comprising a transparent surface, said transparent surface further comprises a sculpted portion providing a tactile clue to a user of the smart device; a feedback structure, said feedback structure capable of providing feedback to the user, according to detection condition regarding the user's hand in relation to touch screen display; a controller, said controller comprising a processor and a computer-readable storage media, said computer-readable storage media capable of storing computer-readable instructions such that when read by said processor, causes the controller to execute the following: detecting the presence of a user's hand underneath a desired part of said touch screen device within said sculpted portion; and delivering a feedback sensation to said user upon the detection of the presence of the user's hand.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "module," "interface," "processor," and "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

Further, as used herein, the above-listed terms are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

One Exemplary Embodiment

In many embodiments of the present systems and methods, a smart device and/or controller may comprise a sculpted and/or shaped touch screen display or transparent covering. This touch screen may be transparent and may support touch screen user interface interactions. In addition, many embodiments may form a mechanically actuator that allows a user to click or otherwise actuate a command—e.g., once a desired action is potentially presented to the user for selection.

Figure 1:
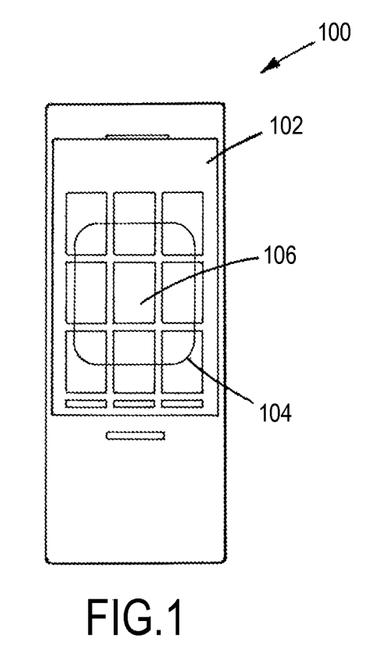
FIG. 1 depicts one exemplary environment of a smart device in which present systems, methods and/or techniques may reside, as made in accordance with the principles of the present application.

FIG. 1 is one exemplary smart device/controller (100) in which the present systems and techniques of the present application may reside and/or be implemented. As may be seen, smart device 100 may present a user with a robust set of user interfaces and their interactions—e.g., to support complex interactions, either with an application running solely on the smart device or in conjunction with other devices, such as televisions, tablets or other devices that may be exhibiting media or other application.

Smart device/controller 100 may comprise a transparent touch screen display 102. Touch screen 102 may be any known and/or suitable touch screen display—e.g., one that comprises a number of touch sensors that are capable of detecting the presence and/or touch of a human user. Such touch screen displays are well-known and may comprise piezo sensors, capacitive, resistive or other types of touch sensor technologies. Touch screen display 102 comprises a contoured surface—as depicted by contour 104. As the user handles the smart device/controller 100, the user feels the contour with touch (e.g., thumb and/or fingers). This contour tends to give the user an intuitive sense of "home" for the initiation and/or actuation of command on the smart device/controller—and possibly without the need to visually regard the smart device/controller.

For merely one example, FIG. 1 shows a number of displayed tiles 106—which could represent any number of UI interface options. In one exemplary embodiment, these tiles may be options for the user to select—e.g., various media selections, application selections or the like. In one embodiment, once the desired selection is identified and possible centered in the middle of the sculpted/contoured display, then the user may apply additional pressure and/or force to mechanically actuate the selection of media, application or the like. Such mechanical actuation may be made possible by mechanically mating the touch screen display to a piezo structure that may sense the additional pressure and/or force. Such additional pressure and/or force gives the user an added sense that the smart device/controller may sense the intentional choice of the user's selection. This may tend to reduce the number of unintended interactions between the user and the smart device/controller—thereby increasing the user's satisfaction of using the smart device/controller.

Figure 2:
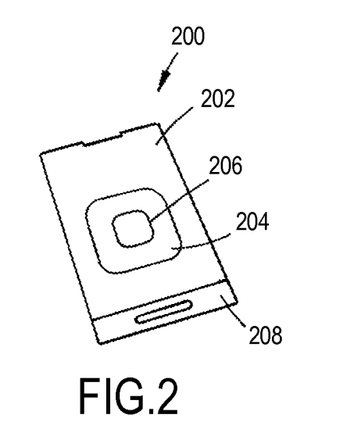
FIG. 2 shows one embodiment of an exemplary sculpted touch screen display as may be incorporated into a suitable smart device.

FIG. 2 is one embodiment of a contoured and/or sculpted transparent surface 200. In one embodiment, surface 200 may be merely a transparent, contoured/sculpted piece of glass, gorilla glass, plastic or any other suitable material. This surface may be a covering that is mated (e.g., mechanically, chemically or any other suitable manner) to a touch screen display—e.g., such that a user's touch would be sufficient to interact with the touch screen display's ability to detect a user's touch and/or actuation. In another embodiment, surface 200 may the integral surface of the touch screen display itself.

In any embodiment, surface 200 comprises a first contouring/sculpting zone 204. This first zone may tend to give a user a tactile sense of "home" or some other suitable orientation familiar to the user. A second, optional, contour/sculpting zone 206 may be formed within the first zone. This second zone may be a zone of actuation—e.g., whereby the user may give additional pressure and/or force in order to actuate a command or otherwise make a selection. Interface 208 may mated with the touch screen and allow communications of data and commands to and from the touch screen and a controller.

Contouring 204 and 206 (and possibly other contouring on the surface) may comprise any number of suitable contouring arrangements. For example, surface 200 may have a substantially flat surface—and first contouring zone 204 may be either a concave or convex contour (e.g., when compared to the substantially flat surface). Second contouring zone 206 may be again be a concave or convex contour (e.g., when compared to the first contour zone). For merely one embodiment, a user's thumb—when swiping from any side—may feel a substantially flat surface, hit a first contour zone (e.g., as a concave surface), then hit a second contour zone (e.g., as a slight convex surface) that may feel like a "home button" or some other intuitive meaning for the user. Many contouring embodiments are of course possible and are encompassed by the scope of this present application.

In another embodiment, second contouring zone 206 (or other desired zones) may affect a plurality of feedback mechanisms to the user. For one example, zone 206 may provide the user a haptic feedback when the user's hand or portion thereof is detected underneath. Such a haptic feedback may be desirable to give the user a "no look" sense (that is, the user may "know" he/she is by virtue of the contour and/or other feedback, without need of looking at the smart device) of being at a "home" button or other desired zone—e.g., to provide navigation or actuate commands, as may be desired and/or allowed the smart device. In another embodiment, an audio feedback may be effected by the smart device when it detects that the user is at home button and/or any other desirable zone.

It will be appreciated that many embodiments comprising a clickable switch, haptic feedback and/or audio feedback are possible—together with the contoured surface. One embodiment might be the contoured/sculpted surface in combination with any one of those switches and/or feedback. Alternatively, another embodiment may comprise the contoured/sculpted surface with two or more—or all three—switches and/or feedback mechanisms.

Figure 3:
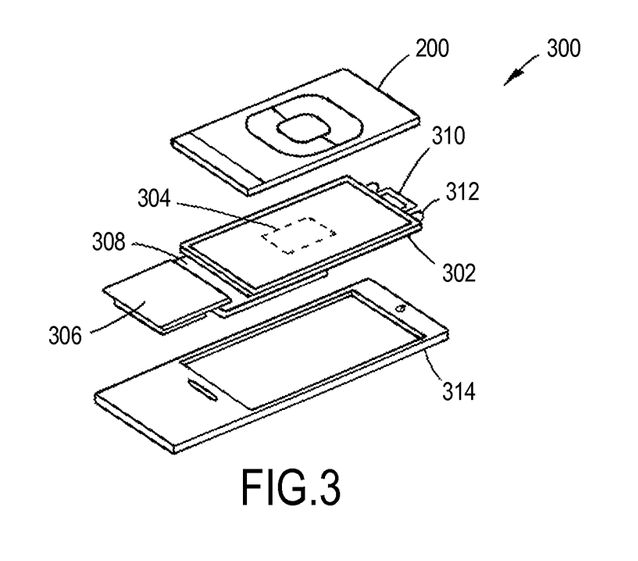
FIGS. 3 and 4 are an exploded view and a cross-sectional view, respectively, of one embodiment of a smart controller as made in accordance with the principles of the present application.

FIG. 3 is an exploded view of one possible embodiment of a smart device/controller 300. Smart device 300 may comprise the touch screen display and/or surface 200 as described. Underneath the touch screen display/surface, there may be an enclosure 302 that mates with the touch screen. Enclosure 302 may further comprise an optional piezo structure 304 that may feel additional pressure and/or force applied by the user—e.g., to possibly actuate a command and/or effect a selection or the like. Alternatively, touch screen 200 may be mechanically mated (e.g. cantilevered) to enclosure 302 in such a manner to effect a "click" or some other mechanical switch and/or selection structure. In another embodiment, structure 304 may be employed to deliver the aforementioned haptic feedback to the user—e.g., to help effect a "no look" guide to the user. It will be appreciated that other haptic structures may be placed throughout the smart device to deliver other haptic feedback.

Figure 4:
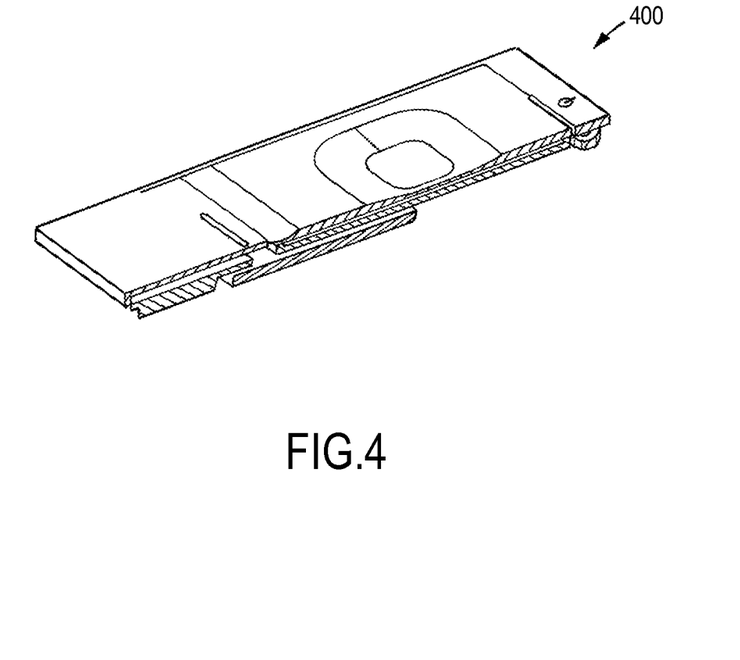

Enclosure may comprise other components as well—such as, e.g., a controller 306 which may comprise a processor, computer-readable storage media that may store computer-readable instructions that enable smart device/controller to execute operating systems instructions, user application instructions and provide suitable I/O interfaces to communicate with touch screen display and/or speaker 310, wireless interface 312 (e.g., infrared, Bluetooth, etc.) Battery 308 may be provided to give power to the smart device. A final enclosure 314 (e.g. plastic, metal or other suitable other material) may be provided for a final form factor for the smart device. FIG. 4 shows a cross-sectional view of the finally constructed smart device of FIG. 3.

Other Embodiments

FIGS. 5 through 8 depict various other embodiments of a smart device/controller as made in accordance with the principles of the present application.

Figure 5:
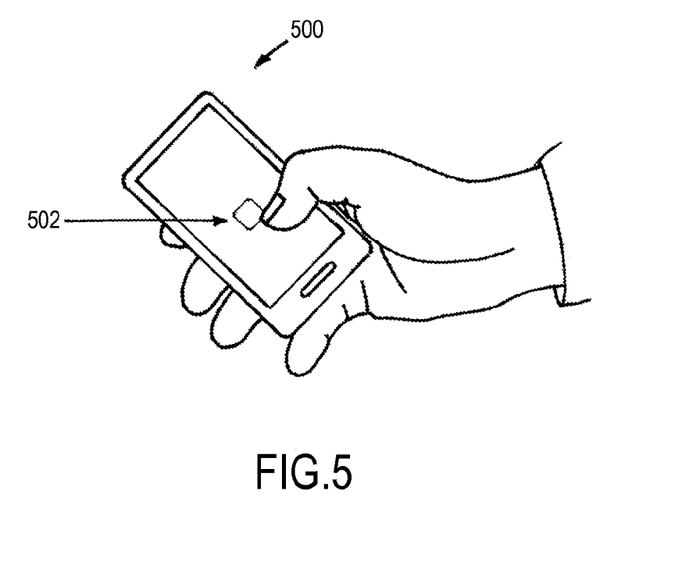
FIGS. 5 through 8 depicts various embodiments of a smart controller that supports touchable and/or clickable user interface as made in accordance with the principles of the present application.

FIG. 5 shows a smart device/controller 500 that comprises a touch screen display/surface that has a first contour/sculpted regions 502. This first region 502 may be either a concave or convex region that may give the user an intuitive "home button". As mentioned, this region may be actuated by the usual touch screen commands—e.g., swiping and/or other gestures. In addition, this first region may be mechanically mated to a piezo structure or some suitable switch mechanism that is responsive to additional pressure and/or force supplied by the user to indicate a command or selection be activated.

Figure 6:
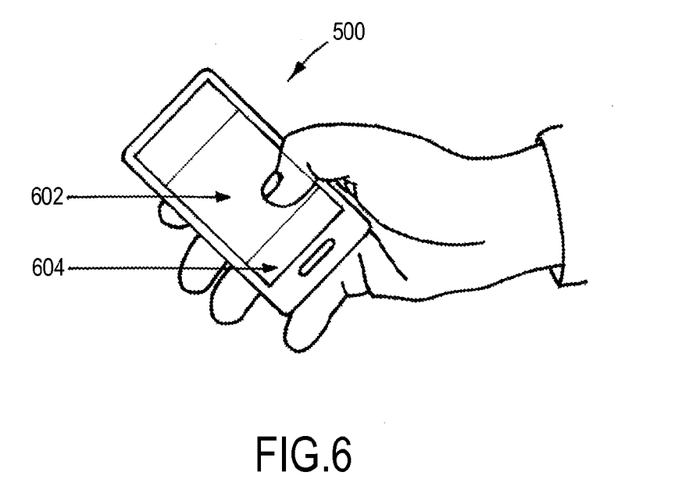

FIG. 6 shows the smart device with possibly a first contour zone 602 and a second zone 604. As mentioned, first zone 602 may be contoured to give the user an intuitive feeling of home. Second zone 604 may be another zone (e.g., contoured or otherwise) that may give the user another intuitive sense. In merely one exemplary embodiment, first zone 602 may be a zone of navigating through a set of data and/or commands; while the second zone may be a zone of command selection. This embodiment may correspond to a remote controller for a television or other media players or the like. Often on a conventional controller, there is a place where the user is allowed to navigate through selections (e.g., channel navigation) and another place where the user may command viewing on such media selections (e.g., play, pause, fast forward or the like). Other embodiments for such first zone and second zone are of course possible.

Figure 7:
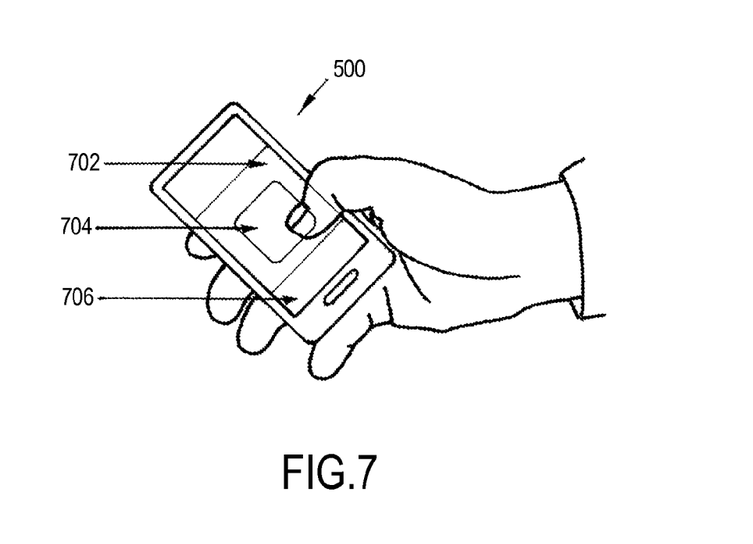

FIG. 7 shows smart device 500 with a first zone 702, a second zone 704 and third 706. First zone 702 may be contoured in one manner (e.g., concave or convex), second zone 704 may be contoured in a same or other manner (e.g., concave or convex) and third zone 706 may be contoured as desired. The nesting of first zone 702 and 704 may give the user an intuitive sense of function as desired.

Figure 8:
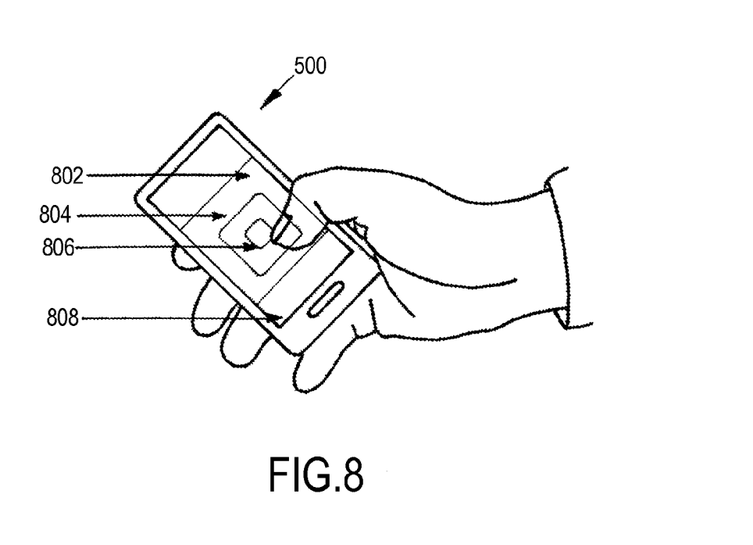

FIG. 8 depicts smart device 500 with first zone 802, second zone 804, third zone 806 and fourth zone 808. As with FIG. 7, the nesting of first, second and third zones may give the user an intuitive sense of home—e.g., with the third zone 806 being a home and/or actuation button in the middle of the nested contour regions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A touch screen display comprising:
a display panel comprising a plurality of touch screen sensors that are capable of detecting the presence of a user touch, and a transparent surface such that light from the display panel is visible to the user of the touch screen display,
the surface of the display panel being substantially flat and comprising a first contour plane,
the transparent surface comprising at least a first sculpted portion and a second sculpted portion, wherein the first sculpted portion forms a first tactile indication to the user of the touch screen display, the first sculpted portion comprising a second contour plane that is either convex or concave relative to the first contour plane,
wherein the second sculpted portion, which is contained at least partially within the first sculpted portion, forms a second tactile indication to the user of the touch screen display, the second sculpted portion comprising a third contour plane that differs from the first contour plane in the direction opposite of the second contour plane, such that the third contour plane is convex when the second contour plane is concave and the third contour plane is concave when the second contour plane is convex.

2. The touch screen display of claim 1 wherein said transparent surface comprises an integral portion of said display panel.

3. The touch screen display of claim 1 wherein said transparent surface comprises a covering mated to display panel.

4. The touch screen display of claim 1 wherein said transparent surface comprises one of a group, said group comprising: glass, gorilla glass, and plastic.

5. The touch screen display of claim 1 wherein the first sculpted portion has a concave profile relative to the profile of the touch screen display and the second sculpted portion has a convex profile relative to the profile of the touch screen display.

6. The touch screen display of claim 1 wherein the transparent surface further comprises a third sculpted portion forming a third tactile indication to the user of the touch screen display.

7. The touch screen display of claim 1 wherein said touch screen display is in mechanical communication with a physical switch such that said physical switch is capable of being activated upon the application of additional pressure by a user on said touch screen display.

8. The smart device of claim 1, wherein the plurality of commands available to the user through the second sculpted portion are based at least upon the content displayed on the touch screen display.

9. The touch screen display of claim 1, wherein the touch screen display is in communication with a smart device such that the user is capable of actuating one of a plurality of commands at the smart device based on pressure applied by the user to the display panel.

10. A smart device comprising:
   a touch screen display comprising a substantially flat transparent surface, the transparent surface further comprising a first contour plane, a first sculpted portion comprising a second contour plane that is either convex or concave relative to the first contour plane and a second sculpted portion, the second sculpted portion being contained at least partially within the first sculpted portion and comprising a third contour plane that differs from the first contour plane in the direction opposite of the second contour plane, such that the third contour plane is convex when the second contour plane is concave and the third contour plane is concave when the second contour plane is convex:
   a plurality of sensors coupled to the touch screen display to actuate a plurality of commands in response to the user interacting with the touch screen display; and
   a controller comprising a processor and a physical computer-readable storage media, the physical computer-readable storage media storing computer-readable instructions that are executable by the processor for enabling the controller to execute the following:
      detect touch input within at least one of the first sculpted portion or the second sculpted portion; and
      detect the actuation of one of the plurality of commands in response to the touch input.

11. The smart device of claim 10 wherein said transparent surface of said touch screen display comprises an integral portion of said display panel.

12. The smart device of claim 10 wherein said transparent surface of said touch screen display comprises a covering mated to display panel.

13. The smart device of claim 10 wherein said transparent surface of said touch screen display comprises one of a group, said group comprising: glass, gorilla glass, and plastic.

14. The smart device of claim 10 wherein the first sculpted portion has a convex profile relative to the profile of the touch screen display and the second sculpted portion has a concave profile relative to the profile of the touch screen display.

15. The smart device of claim 10 wherein the transparent surface further comprises a third sculpted portion forming a third tactile indication to the user of the touch screen display.

16. The smart device of claim 10, wherein actuation of one or more of the plurality of commands occurs in response to the touch input being entered at said first sculpted portion.

17. The smart device of claim 10, wherein actuation of one or more of the plurality of commands occurs in response to the touch input being entered at said second sculpted portion.

18. The smart device of claim 10, wherein the computer-readable instructions are further executable by the processor for enabling the controller to execute at least one command of the plurality of commands in response to the touch input.

19. A smart device comprising:
   a touch screen display comprising a substantially flat transparent surface, the transparent surface further comprising a first contour plane, a first a sculpted portion comprising a second contour plane that is either convex or concave relative to the first contour plane and a second sculpted portion, the second sculpted being at least partially contained within the first sculpted portion and comprising a third contour plane that differs from the first contour plane in the direction opposite of the second contour plane, such that the third contour plane is convex when the second contour plane is concave and the third contour plane is concave when the second contour plane is convex:
   a feedback structure capable of providing feedback to the user according to a detection condition regarding the user's hand in relation to the touch screen display; and
   a controller comprising a processor and a physical computer-readable storage media capable of storing computer-readable instructions such that when read by the processor, causes the controller to execute the following:
      detecting the presence of a user's hand at a desired location of the touch screen device within the second sculpted portion; and
      in response to at least detecting the presence of the user's hand, delivering a feedback sensation to the user.

20. The smart device of claim 19 wherein the first sculpted portion has a concave profile relative to the profile of the touch screen display and the second sculpted portion has a convex profile relative to the profile of the touch screen display.

21. The smart device of claim 20 wherein the second sculpted portion indicates a home button to a user capable of a navigational command and affecting a command for a desired application.

22. The smart device of claim 20 wherein said smart device further comprises a switch, said switch in mechanical communication with said touch screen display such that said switch is capable of being actuated by the user applying additional pressure to the touch screen display.

23. The smart device of claim 19 wherein said feedback structure comprises a haptic structure, said haptic structure capable of delivering a haptic feedback when the smart device detects the user's hand at a desired part of the touch screen display.

24. The smart device of claim 23 wherein said feedback structure further comprises an audio feedback, said audio feedback given by said smart device when the smart device detects the user's hand at a desired part of the touch screen display.

25. The smart device of claim 19 wherein said feedback structure comprises an audio feedback, said audio feedback given by said smart device when the smart device detects the user's hand at a desired part of the touch screen display.

\* \* \* \* \*